(12) United States Patent
Guo et al.

(10) Patent No.: US 10,597,902 B2
(45) Date of Patent: Mar. 24, 2020

(54) LOCK CLUTCHES, LOCK ASSEMBLIES, LOCK COMPONENTS AND METHODS OF MAKING AND USING THEREOF

(71) Applicant: Scyan Electronics LLC, Sammamish, WA (US)

(72) Inventors: Yan Guo, Sammamish, WA (US); Henry Guo, Issaquah, WA (US)

( * ) Notice: Subject to any disclaimer, the term of this patent is extended or adjusted under 35 U.S.C. 154(b) by 91 days.

(21) Appl. No.: 15/491,980

(22) Filed: Apr. 20, 2017

(65) Prior Publication Data

US 2017/0306646 A1   Oct. 26, 2017

Related U.S. Application Data

(60) Provisional application No. 62/325,052, filed on Apr. 20, 2016.

(51) Int. Cl.
| | | |
|---|---|---|
| *E05B 17/04* | (2006.01) | |
| *E05B 47/00* | (2006.01) | |
| *E05B 47/06* | (2006.01) | |
| *F16D 23/12* | (2006.01) | |
| *F16D 11/14* | (2006.01) | |
| *F16D 23/00* | (2006.01) | |
| *E05B 15/04* | (2006.01) | |

(52) U.S. Cl.
CPC .......... *E05B 17/044* (2013.01); *E05B 17/045* (2013.01); *E05B 47/068* (2013.01); *F16D 11/14* (2013.01); *F16D 23/00* (2013.01); *F16D 23/12* (2013.01); *E05B 47/0012* (2013.01); *E05B 2015/0496* (2013.01); *E05B 2047/0026* (2013.01); *E05B 2047/0028* (2013.01); *E05B 2047/0031* (2013.01)

(58) Field of Classification Search
CPC ................ E05B 17/044; E05B 17/045; E05B 2047/0014; E05B 2047/0018; E05B 2047/0026; E05B 2047/003; E05B 2047/0031
See application file for complete search history.

(56) References Cited

U.S. PATENT DOCUMENTS

| | | | | |
|---|---|---|---|---|
| 3,939,679 A | * | 2/1976 | Barker ................. | E05B 47/068 70/277 |
| 6,845,642 B2 | * | 1/2005 | Imedio Ocana ...... | E05B 47/068 70/222 |
| 7,096,697 B2 | * | 8/2006 | Keightly ............. | E05B 47/0012 292/142 |

(Continued)

*Primary Examiner* — Christopher J Boswell

(57) ABSTRACT

A double clutch assembly includes a first clutch assembly and a second clutch assembly. The first clutch assembly includes a cylinder (21), a driver assembly, comprising a control member (11), a driver (1), and a driver shaft (9), wherein the control member (11), the driver (1), the driver shaft (9) and are configured to rotate concentrically together and a follower (2). The cylinder (21) is connected to the driver shaft (9). The rotation of the cylinder (21) causes the driver shaft (9) to engage with or disengage from the follower (2). The second clutch assembly includes an actuating assembly and a coupler (3). The coupler (3) relates to and is configured to rotate concentrically with the driver assembly. The actuating assembly is operably connected to the coupler (3) and is configured to move the coupler (3) causing the coupler (3) to disengage from or engage with the follower (2).

10 Claims, 10 Drawing Sheets

(56) References Cited

U.S. PATENT DOCUMENTS

| | | | |
|---|---|---|---|
| 7,543,469 B1* | 6/2009 | Tseng | E05B 47/026 |
| | | | 292/142 |
| 7,827,837 B2* | 11/2010 | Huang | E05B 47/068 |
| | | | 70/149 |
| 7,966,854 B2* | 6/2011 | Imedio Ocana | E05B 47/0642 |
| | | | 192/69.62 |
| 8,141,400 B2 | 3/2012 | Sorensen | |
| 8,516,865 B2* | 8/2013 | Ferreira Sanchez | |
| | | | E05B 47/0012 |
| | | | 70/472 |
| 8,904,836 B2* | 12/2014 | Guo | E05B 3/003 |
| | | | 292/336.3 |
| 8,931,315 B2 | 1/2015 | Frolov | |
| 9,051,761 B2* | 6/2015 | Romero | E05B 37/00 |
| 9,051,762 B2* | 6/2015 | Huang | E05B 47/0012 |
| 9,464,458 B2* | 10/2016 | Huang | E05B 47/068 |
| 9,790,711 B2* | 10/2017 | McKibben | E05B 47/0001 |
| 2002/0144526 A1* | 10/2002 | Ming-Chih | E05B 47/068 |
| | | | 70/218 |
| 2003/0150248 A1* | 8/2003 | Wu | E05B 55/005 |
| | | | 70/224 |
| 2004/0177660 A1* | 9/2004 | Tsai | E05B 47/068 |
| | | | 70/223 |
| 2007/0169525 A1* | 7/2007 | Chang | E05B 47/068 |
| | | | 70/472 |
| 2009/0133454 A1 | 5/2009 | Frolov | |
| 2010/0294008 A1 | 11/2010 | Bogdanov | |
| 2014/0250956 A1 | 9/2014 | Chong | |
| 2015/0211257 A1* | 7/2015 | Boesel | E05B 17/045 |
| | | | 303/89 |

* cited by examiner

LOCK CLUTCHES, LOCK ASSEMBLIES, LOCK COMPONENTS AND METHODS OF MAKING AND USING THEREOF

CROSS REFERENCE TO RELATED APPLICATIONS

This application claims the benefit of the filing date of U.S. Provisional Application Ser. No. 62/325,052 filed Apr. 20, 2016 under 35 U.S.C. 119(e), the entire disclosure of which is incorporated by reference herein.

TECHNICAL FIELD

The disclosure relates generally to locks and locking devices, and particularly to lock parts, assemblies and components.

BACKGROUND

Unless otherwise indicated herein, the materials described in this section are not prior art to the claims in this application and are not admitted being prior art by inclusion in this section.

A lock is a mechanical or an electronic device for restricting access to an enclosed property. More specifically, the lock is adapted to protect against forced and surreptitious entry to the enclosed property or the area. The lock may be used on a door, furniture, a vehicle, a container such as a storage box, or a bike.

A clutch mechanism inside a lock system often leads to coupling or uncoupling of various components in the lock therefore locking or unlocking the lock system.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

In one aspect, the disclosure provides clutch assemblies for locks. In one embodiment, the clutch assembly includes a driver assembly, a follower (2) and a cylinder (21). The driver assembly includes a driver (1) and a driver shaft (9), and the driver (1) and the driver shaft (9) are configured to rotate concentrically together. The cylinder (21) is operably connected to the driver shaft (9) such that the rotation of the cylinder (21) is configured to move the driver shaft (9) linearly causing the driver shaft (9) to engage with or disengage from the follower (2). When the driver shaft (9) engages with the follower (2), the follower (2) is operably connected with the driver assembly and rotates concentrically together with the driver assembly. When the drive shaft (9) disengages with the follower (2), the follower (2) is operably disconnected with the driver assembly.

The driver shaft (9) may have a first driver end (19) and a second driver end (25). The driver shaft (9) may be operably connected to the cylinder (21) at the first driver end (19) and is configured to engage with the follower (2) at the second driver end (25). The second driver end (25) may include a first engaging structure, and the follower (2) may include a second engaging structure. The first engaging structure may be configured to engage with the second engaging structure therefore operably connecting the driver shaft (9) to the follower (2).

The driver assembly may further include a control member (11). The control member (11) may be operably connected to the driver (1) and the control member (11), the driver (1) and the driver shaft (9) are configured to rotate concentrically together.

The driver assembly further comprises a coupler (3). The driver (1), the coupler (3) and the driver shaft (9) are configured to rotate concentrically together. The coupler (3) are configured to engage or disengage the follower (2). The follower (2) may be configured to rotate concentrically together with the driver assembly when engaged with the coupler (3), and the follower (2) is disconnected from the driver assembly when disengaged from the coupler (3).

The clutch assembly may further include a control member (11). The control member (11) may be operably coupled to the driver (1) such that the control member (11), the driver (1), the driver shaft (9) and the coupler (3) are configured to rotate concentrically together.

In one embodiment, the clutch assembly may include an actuating assembly. The actuating assembly may be operably connected to the coupler (3) and is configured to move the coupler (3) causing the coupler (3) to disengage from or engage with the follower (2). In one embodiment, the actuating assembly may include a power source (8) such as an electric motor or a manually operated device.

In one embodiment, the power source (8) may be operably connected to an actuating arm (4) and the actuating arm (4) is operably connected to the coupler (3). The power source (8) is configured to move the actuating arm (4), which causes the coupler (3) to move along the central axis of the driver shaft (9) disengaging from or engaging with the follower (2).

In some embodiments, the clutch assembly may further include a latch or a deadbolt operably connected to the follower (2). The rotation of the follower (2) is configured to produce a linear motion on the latch or the deadbolt. Therefore, the rotation of the control member (11) is configured to produce a linear motion on the latch or the deadbolt when the coupler (3) is engaged with the follower (2).

In another aspect, the disclosure provides double clutch assemblies. In one embodiment, the double clutch assemblies include a first clutch assembly and a second clutch assembly. The first clutch assembly includes a cylinder (21), a driver assembly and a follower (2). The driver assembly includes a control member (11), a driver (1), and a driver shaft (9). The control member (11), the driver (1), the driver shaft (9) and are configured to rotate concentrically together. The cylinder (21) is operably connected to the driver shaft (9) such that the rotation of the cylinder (21) is configured to move the driver shaft (9) linearly causing the driver shaft (9) to engage with or disengage from the follower (2). When the driver shaft (9) engages with the follower (2), the follower (2) is operably connected with the driver assembly and rotates concentrically together with the driver assembly. When the drive shaft (9) disengages with the follower (2), the follower (2) is operably disconnected with the driver assembly. The second clutch assembly includes an actuating assembly and a coupler (3). The coupler (3) is operably connected with and therefor is configured to rotate concentrically with the driver assembly. The actuating assembly is operably connected to the coupler (3) and is configured to move the coupler (3) causing the coupler (3) to disengage from or engage with the follower (2). When the coupler (3) engages with the follower (2), the follower (2) is operably connected with the driver assembly and rotates concentrically together with the driver assembly, and wherein, when the coupler (3) disengages with the follower (2), the follower (2) is operably disconnected with the driver assembly.

In another aspect, the disclosure provides lock systems including the clutch assembly described thereof. In one embodiment, rotating the control member (11) is configured to retract and extend the latch or the deadbolt when the coupler (3) is engaged with the follower (2), and the control member (11) is disconnected from the latch or the deadbolt when the coupler (3) is disengaged from the follower (2).

In one embodiment, the lock system further includes an authenticating device. The authenticating device is configured to authenticate an operator and to control the engagement and disengagement between the coupler (3) and the follower (2) therefore connecting and disconnecting the control member (11) with the latch or deadbolt. When the authenticating device authenticates the operator, the coupler (3) engages with the follower (2) allowing the operator to extend and retract the latch or deadbolt by rotating the control member (11). In one embodiment, the lock system is a deadbolt lock.

The authenticating device comprises a key operated lock mechanism, a biometric authenticating mechanism, a passcode authenticating mechanism, or a wireless sensing device. In one embodiment, the lock system includes at least two of the authenticating devices selected from a key operated lock mechanism, a biometric authenticating mechanism, a passcode authenticating mechanism, or a wireless sensing device. In some embodiments, the lock system includes at least three of the authenticating devices. The biometric authenticating mechanism is configured to authenticate a fingerprint, an iris pattern, a cardio-electromagnetic wave, a voice, a sound combination, a gesture, or a combination thereof. The wireless sensing device is configured to receive an authenticating signal from a mobile device. The authenticating signal from a mobile device comprises an authenticating signal derived from authenticating a fingerprint, an iris pattern, a cardio-electromagnetic wave, a voice, a sound, a gesture, or a combination thereof. In one embodiment, the lock system is a fingerprint activated deadbolt lock. In one embodiment, the lock system is a passcode activated deadbolt lock.

In a third aspect, the disclosure provides the lock kit including the clutch assembly described thereof.

In a fourth aspect, the disclosure provides the door including the lock system described thereof.

In a further aspect, the disclosure provides methods for locking or unlocking a lock system by an operator. In one embodiment, the method includes operably connecting the control member (11) with the latch or deadbolt by activating at least one of the first or the second clutch assembly. The first assembly system may be activated by rotating the cylinder (21) using a key and engaging the driver shaft (9) with the follower (2). The second assembly system is activated by authenticating the operator using the authenticating device, and, if the operator is authenticated, engaging the coupler (3) with the follower (2) and therefore, and turning the control member (11) to extend or retract the latch or deadbolt and therefore lock or unlock the lock system.

In one embodiment, the step of authenticating the operator includes authenticating a biometric signal from the operator using the authenticating device. In another embodiment, the step of authenticating the operator includes authenticating a passcode input from the operator using the authenticating device.

The representative embodiments of the disclosure include:

A clutch assembly for a lock system, comprising, a driver assembly, comprising a driver (1) and a driver shaft (9), wherein the driver (1) and the driver shaft (9) are configured to rotate concentrically together; a follower (2); and a cylinder (21), wherein the cylinder (21) is operably connected to the driver shaft (9) such that the rotation of the cylinder (21) is configured to move the driver shaft (9) linearly causing the driver shaft (9) to engage with or disengage from the follower (2), wherein, when the driver shaft (9) engages with the follower (2), the follower (2) is operably connected with the driver assembly and rotates concentrically together with the driver assembly, and wherein, when the drive shaft (9) disengages with the follower (2), the follower (2) is operably disconnected with the driver assembly.

In one embodiment, the driver shaft (9) has a first driver end (19) and a second driver end (25), wherein the driver shaft (9) is operably connected to the cylinder (21) at the first driver end (19) and is configured to engage with the follower (2) at the second driver end (25).

In one embodiment, the first driver end (19) is operably connected to the cylinder (21) through a coil spring (18), and wherein the coil spring (18) and is configured to rotate with the cylinder (21).

In one embodiment, the coil spring (18) is operably connected to the cylinder (21) at a first spring end and to the first driver end (19) at a second spring end.

In one embodiment, the first driver end (19) comprises a protruding structure (20), wherein the protruding structure (20) is configured to slide between the threads of the coil spring (18) such that rotation of the coil spring (18) causes the driver shaft (9) to move linearly along the central axis of the coil spring (18).

In one embodiment, the second driver end (25) comprises a first engaging structure, and wherein the follower (2) comprises a second engaging structure, wherein the first engaging structure is configured to engage with the second engaging structure therefore operably connecting the driver shaft (9) to the follower (2).

In one embodiment, the first engaging structure is a polygon shaped tip at the second driver end (25) and the second engaging structure is a polygon-shaped aperture (17) on the follower (2), and wherein, when the polygon-shaped tip mates with the polygon-shaped bore, the driver assembly is operably connected with the follower (2).

In one embodiment, at least a portion of the driver shaft (9) comprises a polygon-shaped cross-section.

In one embodiment, the driver (1) comprises a polygon-shaped hole (23), and wherein the driver (1) and the driver shaft (9) are operably connected by threading at least the portion of the driver shaft (9) having the polygon-shaped cross-section through the polygon-shaped hole (23) such that the polygon-shaped section of the driver shaft (9) mates with the polygon-shaped hole (23), and wherein at least a portion of the driver shaft (9) is configured to freely slide through the polygon-shaped hole while the driver shaft (9) is configured to rotate concentrically with the driver (1).

In one embodiment, the driver assembly further comprises a control member (11), wherein the control member (11) is operably connected to the driver (1) and wherein the control member (11), the driver (1) and the driver shaft (9) are configured to rotate concentrically together.

The clutch assembly further comprises a coupler (3), wherein the coupler (3) is configured to rotate concentrically together with the driver assembly, wherein the coupler (3) are configured to engage or disengage the follower (2), wherein the follower (2) is configured to rotate concentrically together with the driver assembly when engaged with the coupler (3), and wherein the follower (2) is disconnected from the driver assembly when disengaged from the coupler (3).

In one embodiment, the coupler (3) is configured to move along the central axis of the driver shaft (9) to engage or disengage the follower (2).

In one embodiment, the clutch assembly further comprises an actuating assembly, wherein the actuating assembly is operably connected to the coupler (3) and is configured to move the coupler (3) causing the coupler (3) to disengage from or engage with the follower (2).

In one embodiment, the clutch assembly further comprises an actuating assembly, wherein the actuating assembly is operably connected to the coupler (3) and is configured to move the coupler (3) along the central axis of the driver shaft (9) causing the coupler (3) to disengage from or engage with the follower (2).

In one embodiment, the actuating assembly comprises a power source (8).

In one embodiment, the power source (8) is an electric motor.

In one embodiment, the actuating assembly is manually operated.

In one embodiment, the power source (8) is operably connected to an actuating arm (4), wherein the actuating arm (4) is operably connected to the coupler (3), wherein the power source (8) is configured to move the actuating arm (4), which causes the coupler (3) to move along the central axis of the driver shaft (9) disengaging from or engaging with the follower (2).

In one embodiment, the power source (8) is a motor, wherein the motor comprises a rotation shaft (7), and wherein the rotation shaft (7) is operably connected to the actuating arm (4) and is configured to rotate with the actuating arm (4).

In one embodiment, the actuating arm (4) has a first arm end and the second arm end, wherein the first arm end is operably connected the rotation shaft (7), wherein the second arm end is operably connected to the coupler (3).

In one embodiment, the first arm end comprises a spring (6) and the spring (6) is configured to rotate with the rotation shaft (7) causing movement on the actuating arm (4), and wherein the second arm end comprises a hook (5), wherein the hook (5) hooks onto the coupler (3).

In one embodiment, the driver shaft (9) has a polygon-shaped cross-section. For example, the polygon may be a triangle, a square, a rectangle, a tetrahedral, a pentagon, a hexagon, a heptagon, or an octagon.

In one embodiment, the coupler (3) comprises a polygon-shaped central bore (16), and wherein the coupler (3) is threaded onto the driving shaft (9) through the polygon-shaped central bore (16).

In one embodiment, the coupler (3) comprises a first coupling structure (12), wherein the follower (2) comprises a second coupling structure (15), wherein the first coupling structure (12) is configured to engage with the second coupling structure (15), and wherein the coupler (3) and the follower (2) are configured to rotate concentrically together when the first and the second coupling structure are engaged.

In one embodiment, the first coupling structure comprises at least one protruding structure, wherein the second coupling structure comprises at least one indenting structure, and wherein the protruding structure is configured to mate with the indenting structure.

In one embodiment, the coupler (3) comprises a first coupling structure (12), wherein the follower (2) comprises a second coupling structure (15), wherein the first coupling structure (12) is configured to mate with the second coupling structure (15).

In one embodiment, the clutch assembly further comprises a latch or a deadbolt operably connected to the follower (2), wherein the rotation of the follower (2) is configured to produce a linear motion on the latch or the deadbolt.

In one embodiment, the driver assembly further comprises a control member (11), wherein the control member (11) is operably coupled to the driver (1) such that the control member (11), the driver (1), the driver shaft (9) and the coupler (3) are configured to rotate concentrically together.

In one embodiment, the follower (2) is configured to rotate concentrically together the driver assembly when engaged with the coupler (3) and wherein the follower (2) is configured to be disconnected from the driver assembly when disengaged from the coupler (3).

In one embodiment, the clutch assembly further comprises a latch or a deadbolt operably connected to the follower (2), wherein the rotation of the control member (11) is configured to produce a linear motion on the latch or the deadbolt when the coupler (3) is engaged with the follower (2).

In one embodiment, the control member is a knob, a handle, a round structure, an oval structure, an oblong structure, or a polygon structure.

A lock system comprises the clutch assembly of 32, wherein rotating the control member (11) is configured to retract and extend the latch or the deadbolt when the coupler (3) is engaged with the follower (2), and wherein the control member (11) is disconnected from the latch or the deadbolt when the coupler (3) is disengaged from the follower (2).

In one embodiment, the lock system further comprises an authenticating device, wherein the authenticating device is configured to authenticate an operator and to control the engagement and disengagement between the coupler (3) and the follower (2) therefore connecting and disconnecting the control member (11) with the latch or deadbolt.

In one embodiment, when the authenticating device authenticates the operator, the coupler (3) engages with the follower (2) allowing the operator to extend and retract the latch or deadbolt by rotating the control member (11).

In one embodiment, the authenticating device comprises a key operated lock mechanism, a biometric authenticating mechanism, a passcode authenticating mechanism, or a wireless sensing device.

In one embodiment, the lock system comprises at least two of the authenticating devices selected from a key operated lock mechanism, a biometric authenticating mechanism, a passcode authenticating mechanism, or a wireless sensing device.

In one embodiment, the lock system comprises at least three of the authenticating devices selected from a key operated lock mechanism, a biometric authenticating mechanism, a passcode authenticating mechanism, or a wireless sensing device.

In one embodiment, the biometric authenticating mechanism is configured to authenticate a fingerprint, an iris pattern, a cardio-electromagnetic wave, a voice, a sound combination, a gesture, or a combination thereof.

In one embodiment, the wireless sensing device is configured to receive an authenticating signal from a mobile device.

In one embodiment, the authenticating signal from a mobile device comprises an authenticating signal derived from authenticating a fingerprint, an iris pattern, a cardio-electromagnetic wave, a voice, a sound, a gesture, or a combination thereof.

A lock system kit comprises the clutch assembly as disclosed herein.

A door comprises the lock system as disclosed herein.

A double clutch assembly for a lock system comprises a first clutch assembly, comprising, a cylinder (21), a driver assembly, comprising a control member (11), a driver (1), and a driver shaft (9), wherein the control member (11), the driver (1), the driver shaft (9) and are configured to rotate concentrically together; a follower (2), and wherein the cylinder (21) is operably connected to the driver shaft (9) such that the rotation of the cylinder (21) is configured to move the driver shaft (9) linearly causing the driver shaft (9) to engage with or disengage from the follower (2), wherein, when the driver shaft (9) engages with the follower (2), the follower (2) is operably connected with the driver assembly and rotates concentrically together with the driver assembly, and wherein, when the drive shaft (9) disengages with the follower (2), the follower (2) is operably disconnected with the driver assembly; and a second clutch assembly, comprising an actuating assembly, a coupler (3), wherein the coupler (3) is operably connected with and therefor is configured to rotate concentrically with the driver assembly, wherein the actuating assembly is operably connected to the coupler (3) and is configured to move the coupler (3) causing the coupler (3) to disengage from or engage with the follower (2), wherein, when the coupler (3) engages with the follower (2), the follower (2) is operably connected with the driver assembly and rotates concentrically together with the driver assembly, and wherein, when the coupler (3) disengages with the follower (2), the follower (2) is operably disconnected with the driver assembly. In one embodiment, the coupler (3) comprises a first coupling structure (12), wherein the follower (2) comprises a second coupling structure (15), wherein the first coupling structure is configured to engage with the second coupling structure, and wherein the follower (2) is configured to be operably connected with or disconnected from the coupler (3), when the first coupling structure is engaged with or disengaged from the second coupling structure, respectively.

In one embodiment, the actuating assembly comprises a motor (8) having a rotation shaft (7), wherein the motor (8) is configured to rotate the rotation shaft (7); and an actuating arm (4) having a first end and the second end, wherein the first end is operably connected to the rotation shaft (7), wherein the second end is operably connected to the coupler (3), wherein the motor (8) is configured to rotate the first end of the actuating arm (4) through the rotation shaft (7) producing a swing motion at the second end of the actuating arm (4), wherein the swing motion at the second end of the actuating arm is configured to cause the coupler (3) to move back and forth along the central axis of the driver shaft (9) leading to the disengagement and engagement between the first and the second coupling structure.

In one embodiment, the first end of the actuating arm (4) comprises a spring (6) and wherein the first end is operably connected to the rotation shaft (7) by wounding the spring (6) onto to the rotation shaft (7).

In one embodiment, the coupler (3) comprises a groove (10), wherein the second end of the actuating arm (4) comprises a hook (5), and wherein the hook (5) is placed into the groove (10).

In one embodiment, the driving shaft (9) has a polygon-shaped cross-section, wherein the coupler (3) comprises a polygon-shaped central bore (16), wherein the coupler (3) is threaded onto the driving shaft (9) through the polygon-shaped central core (16) allowing the coupler to slide along the central axis of the driving shaft (9).

In one embodiment, the double clutch assembly further comprises a latch or a deadbolt operably connected to the follower (2), wherein, when the coupler (3) is disengaged from the follower (2), the control member (11) is disconnected from the latch or the deadbolt, and wherein, when the coupler (3) is engaged with the follower (2), rotating the control member (11) is configured to produce a linear motion on the latch or deadbolt.

A lock system comprises the double clutch assembly as disclosed herein, wherein, when the coupler (3) is engaged with the follower (2), rotating the control member (11) is configured to retract and extend the latch or the deadbolt, and wherein, when the coupler (3) is disengaged from the follower (2), the control member (11) is disconnected from the latch or the deadbolt.

In one embodiment, the lock system further comprises an authenticating device, wherein the authenticating device is configured to authenticate an operator and to control the engagement and disengagement between the coupler (3) and the follower (2) therefore connecting and disconnecting the control member (11) with the latch or deadbolt.

In one embodiment, when the authenticating device authenticates the operator, the coupler (3) engages with the follower (2) allowing the operator to extend and retract the latch or deadbolt by rotating the control member (11).

In one embodiment, the authenticating device comprises a key operated lock mechanism, a biometric authenticating mechanism, a passcode authenticating mechanism, or a wireless sensing device.

In one embodiment, the lock system comprises at least two of the authenticating devices selected from a key operated lock mechanism, a biometric authenticating mechanism, a passcode authenticating mechanism, or a wireless sensing device.

In one embodiment, the lock system comprises at least three of the authenticating devices selected from a key operated lock mechanism, a biometric authenticating mechanism, a passcode authenticating mechanism, or a wireless sensing device.

In one embodiment, the biometric authenticating mechanism is configured to authenticate a fingerprint, an iris pattern, a cardio-electromagnetic wave, a voice, a sound combination, a gesture, or a combination thereof.

In one embodiment, the wireless sensing device is configured to receive an authenticating signal from a mobile device.

In one embodiment, the authenticating signal from a mobile device comprises an authenticating signal derived from authenticating a fingerprint, an iris pattern, a cardio-electromagnetic wave, a voice, a sound, a gesture, or a combination thereof.

A lock system kit, comprising the double clutch assembly as disclosed herein.

A door, comprising the lock system as disclosed herein.

A method for locking or unlocking a lock system as disclosed herein by an operator, comprising, operably connecting the control member (11) with the latch or deadbolt by activating at least one of the first or the second clutch assembly, wherein the first assembly system is activated by rotating the cylinder (21) using a key and engaging the driver shaft (9) with the follower (2); wherein the second assembly system is activated by authenticating the operator using the authenticating device, and, if the operator is authenticated, engaging the coupler (3) with the follower (2)

and therefore, and turning the control member (11) to extend or retract the latch or deadbolt and therefore lock or unlock the lock system.

In one embodiment, authenticating the operator comprising authenticating a biometric signal from the operator using the authenticating device.

In one embodiment, authenticating the operator comprising authenticating a passcode input from the operator using the authenticating device.

DETAILED DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

DETAILED DESCRIPTION

Figure 1:
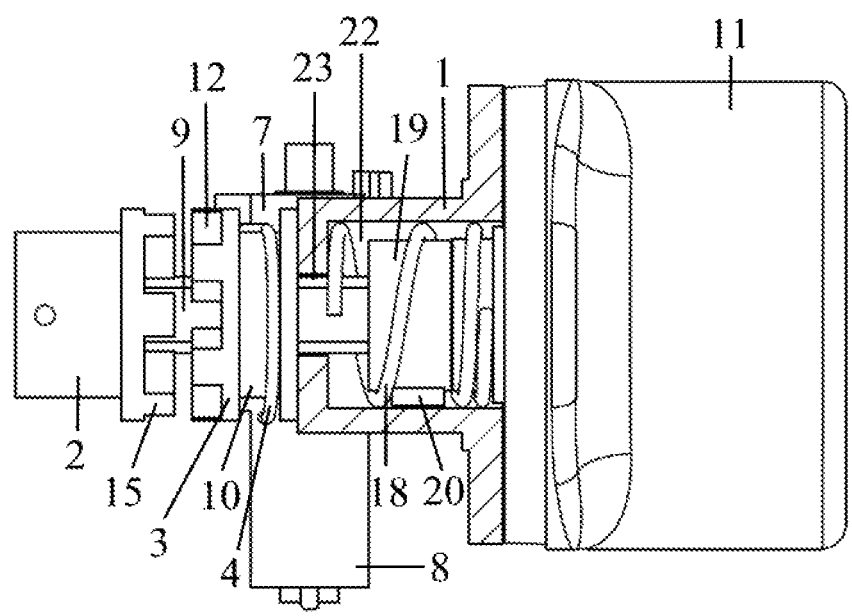
FIG. 1 shows an example double clutch assembly with the coupler (3) and follower (2) disengaged.
Figure 2:
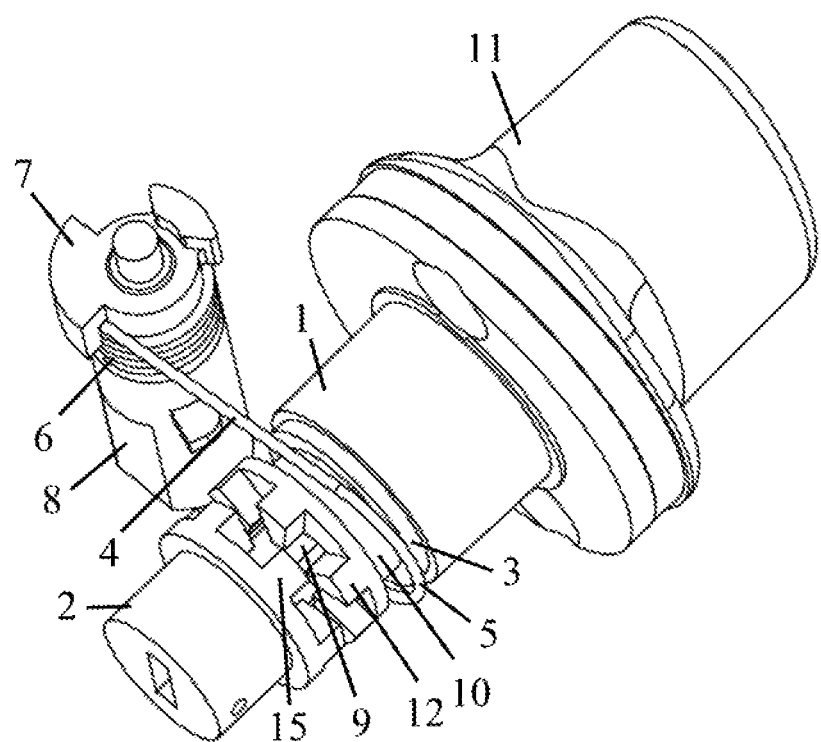
FIG. 2 shows an example double clutch assembly with the coupler (3) and the follower (2) disengaged.
Figure 3:
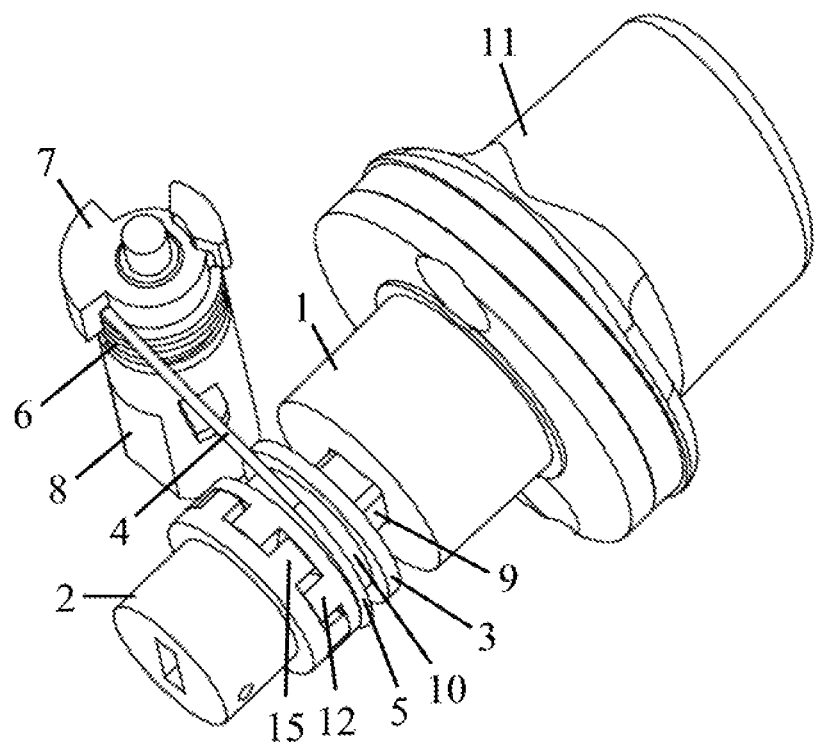
FIG. 3 shows an example double clutch assembly with the coupler (3) and the follower (2) engaged.
Figure 4:
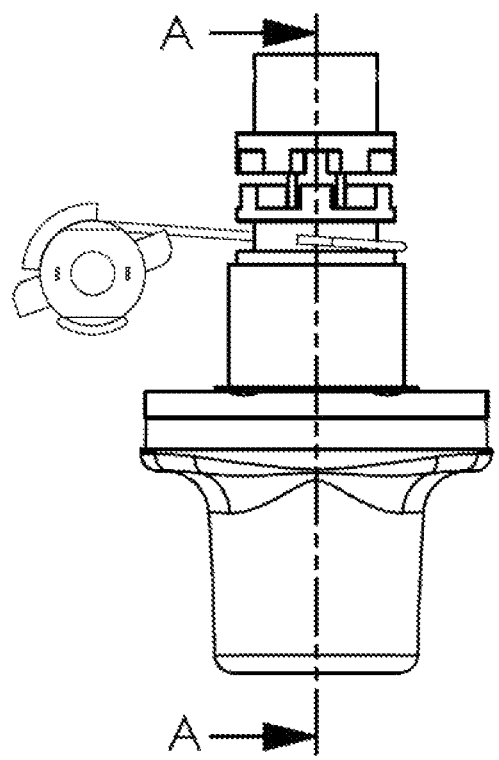
FIG. 4 is a plan view of an example double clutch assembly with the coupler (3) and the follower (2) disengaged.
Figure 5:
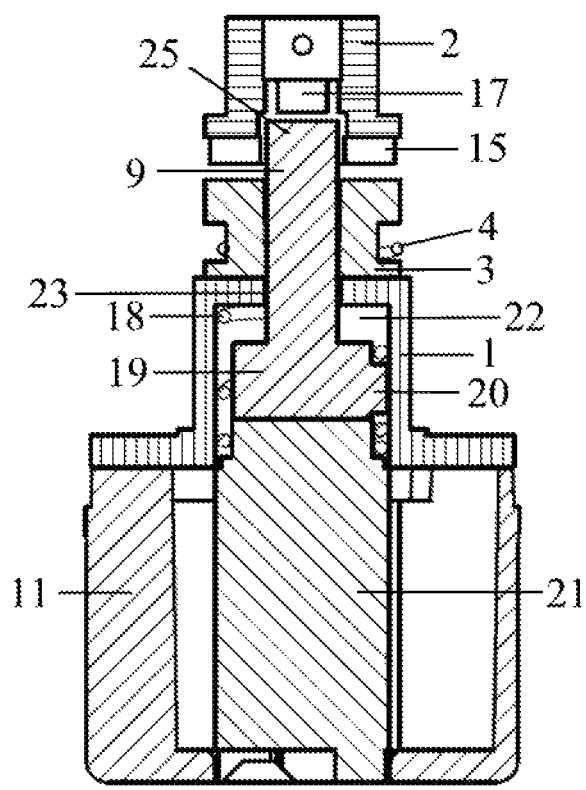
FIG. 5 is a cross-sectional view of the example double clutch assembly along the AA axis as shown in FIG. 4 with the driver shaft (9) and the follower (2) disengaged.
Figure 6:
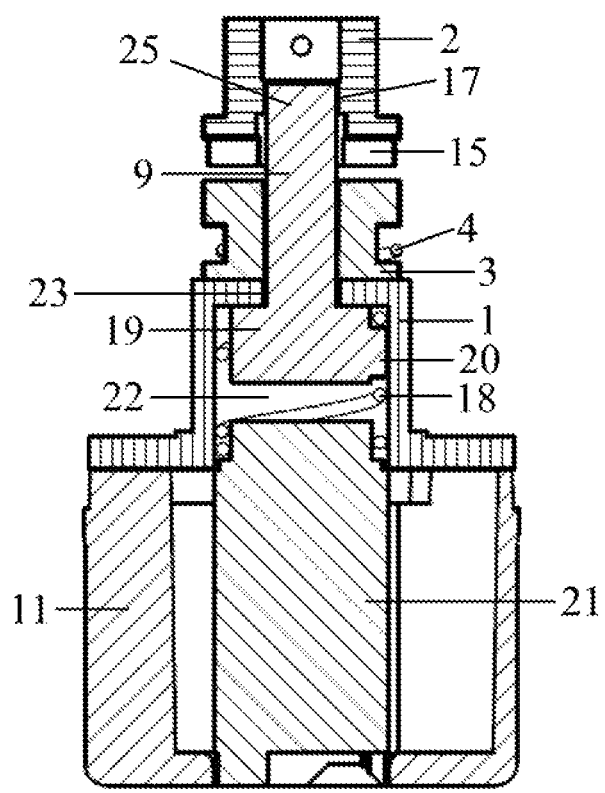
FIG. 6 is a cross-sectional view of the example double clutch assembly along the AA axis as shown in FIG. 4 with driver shaft (9) and the follower (2) engaged.
Figure 7:
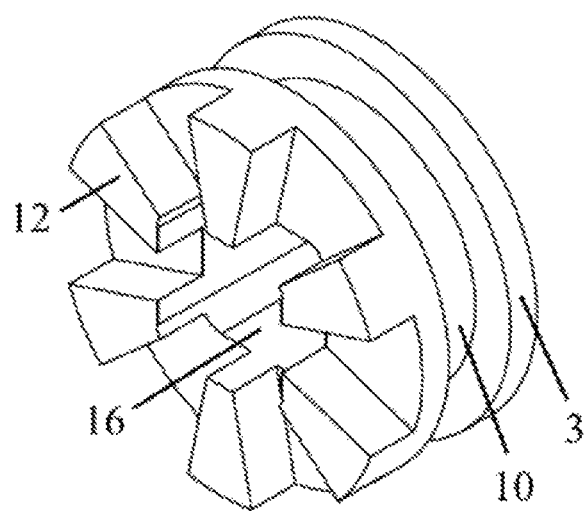
FIG. 7 shows an example coupler (3) having a polygon-shaped bore (16) and a first coupling structure (12)
Figure 8:
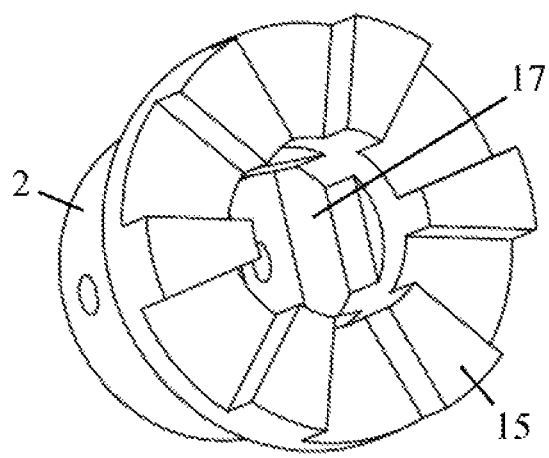
FIG. 8 shows an example follower (2) having a second coupling structure (15) and a second engaging structure (17) as a polygon-shaped aperture.
Figure 9:
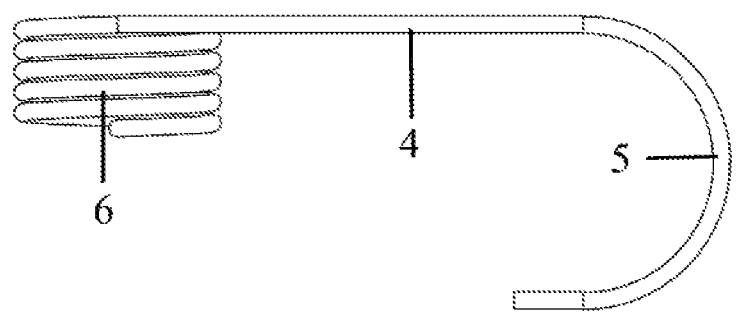
FIG. 9 shows an example actuating arm (4) having a spring (6) at the first arm end and a hook (5) at the second arm end.
Figure 10:
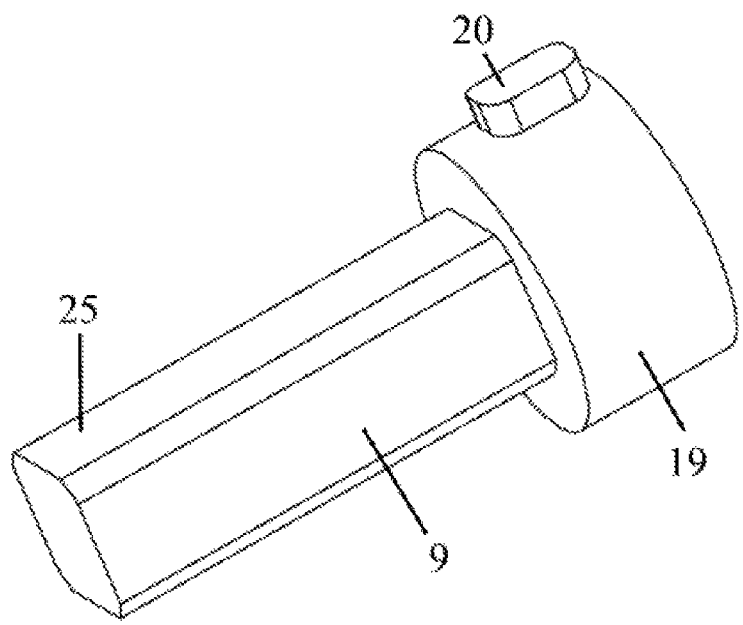
FIG. 10 shows an example driver shaft (9) having a protruding structure (20) at the first driver shaft end (19) and a polymer shaped tip as the second engaging structure at the second driver shaft end.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among others, to clutching assemblies or mechanisms, locks containing the clutching mechanism, and methods, apparatus, systems, and/or devices related to the locks and the clutching mechanism clutches. For example, the present disclosure relates generally to lock systems which may be employed with entry control devices to control access through a door or to furniture. The clutch assemblies and lock systems containing the clutching assemblies provided in this disclosure may have the advantage of, without limitation, simple, durable, easy to use, and low production cost.

In one aspect, the clutch assemblies for locks are provided. In one embodiment, the clutch assembly for a lock system includes a driver assembly, a follower and a cylinder. The driver assembly includes a driver (1) and a driver shaft (9), and the driver (1) and the driver shaft (9) are configured to rotate concentrically together. The cylinder (21) is operably connected to the driver shaft (9) such that the rotation of the cylinder (21) is configured to move the driver shaft (9) linearly causing the driver shaft (9) to engage with or disengage from the follower (2). When the driver shaft (9) engages with the follower (2), the follower (2) is operably connected with the driver assembly and rotates concentrically together with the driver assembly. When the drive shaft (9) disengages with the follower (2), the follower (2) is operably disconnected with the driver assembly.

In one embodiment, the driver shaft (9) has a first driver end (19) and a second driver end (25). The driver shaft (9) is operably connected to the cylinder (21) at the first driver end (19) and is configured to engage with the follower (2) at the second driver end (25). In one embodiment, the first driver end (19) is operably connected to the cylinder (21) through a coil spring (18), and the coil spring (18) and is configured to rotate with the cylinder (21). In one embodiment, the coil spring (18) is operably connected to the cylinder (21) at a first spring end and to the first driver end (19) at a second spring end. In one embodiment, the first driver end (19) includes a protruding structure (20), and the protruding structure (20) is configured to slide between the threads of the coil spring (18) such that rotation of the coil spring (18) causes the driver shaft (9) to move linearly along the central axis of the coil spring (18).

In one embodiment, the second driver end (25) includes a first engaging structure, and the follower (2) includes a second engaging structure. The first engaging structure is configured to engage with the second engaging structure therefore operably connecting the driver shaft (9) to the follower (2). In one embodiment, the first engaging structure is a polygon shaped tip at the second driver end (25) and the second engaging structure is a polygon-shaped aperture (17) on the follower (2). When the polygon-shaped tip mates with the polygon-shaped bore, the driver assembly is operably connected with the follower (2).

In one embodiment, at least a portion of the driver shaft (9) comprises a polygon-shaped cross-section. In one embodiment, the driver (1) includes a polygon-shaped hole (23). The driver (1) and the driver shaft (9) are operably connected by threading at least the portion of the driver shaft (9) having the polygon-shaped cross-section through the polygon-shaped hole (23) such that the polygon-shaped section of the driver shaft (9) mates with the polygon-shaped hole (23). At least a portion of the driver shaft (9) is configured to freely slide through the polygon-shaped hole while the driver shaft (9) is configured to rotate concentrically with the driver (1).

In one embodiment, the clutch assembly may further include a coupler (3). The driver (1), the coupler (3) and the driver shaft (9) are configured to rotate concentrically together. The coupler (3) is configured to engage or disengage the follower (2). The follower (2) is configured to rotate concentrically together with the driver assembly when engaged with the coupler (3), and the follower (2) is disconnected from the driver assembly when disengaged from the coupler (3). In one embodiment, the coupler (3) is configured to move along the central axis of the driver shaft (9) to engage or disengage the follower (2).

In one embodiment, the clutch assembly further includes an actuating assembly, which is operably connected to the coupler (3) and is configured to move the coupler (3) causing the coupler (3) to disengage from or engage with the follower (2). In one embodiment, the actuating assembly is operably connected to the coupler (3) and is configured to move the coupler (3) along the central axis of the driver shaft (9) causing the coupler (3) to disengage from or engage with the follower (2). In one embodiment, the actuating assembly includes a power source (8) including, without limitation, an electric motor or a manually operated device. In one embodiment, the power source (8) is operably connected to an actuating arm (4). The actuating arm (4) is operably connected to the coupler (3). The power source (8) is configured to move the actuating arm (4), which causes the coupler (3) to move along the central axis of the driver shaft (9) disengaging from or engaging with the follower (2).

In one embodiment, the power source (8) is a motor. The motor includes a rotation shaft (7), which is operably connected to the actuating arm (4) and is configured to rotate with the actuating arm (4). In one embodiment, the actuating arm (4) has a first arm end and the second arm end. The first arm end is operably connected the rotation shaft (7). The second arm end is operably connected to the coupler (3). In one embodiment, the first arm end includes a spring (6) and the spring (6) is configured to rotate with the rotation shaft (7) causing movement on the actuating arm (4). The second arm end comprises a hook (5) and the hook (5) hooks onto the coupler (3).

In one embodiment, the driver shaft (9) has a polygon-shaped cross-section. The polygon may include without limitation a triangle, a square, a rectangle, a tetrahedral, a pentagon, a hexagon, a heptagon, or an octagon. In one embodiment, the coupler (3) has a polygon-shaped central bore (16), and the coupler (3) is threaded onto the driving shaft (9) through the polygon-shaped central bore (16). In one embodiment, the coupler (3) includes a first coupling structure (12). The follower (2) includes a second coupling structure (15). The first coupling structure (12) is configured to engage with the second coupling structure (15). The coupler (3) and the follower (2) are configured to rotate concentrically together when the first and the second coupling structure are engaged.

In one embodiment, the first coupling structure may include at least one protruding structure. The second coupling structure includes at least one indenting structure. The protruding structure is configured to mate with the indenting structure. In one embodiment, the first coupling structure (12) is a teethed structure. In some embodiments, the second coupling structure (15) is a teethed structure. In some embodiments, the first coupling structure (12) is configured to mate with the second coupling structure (15).

In one embodiment, the clutch assembly further includes a latch or a deadbolt operably connected to the follower (2). The rotation of the follower (2) is configured to produce a linear motion on the latch or the deadbolt when the coupler (3) is engaged with the follower (2).

In one embodiment, the driver assembly further comprises a control member (11), wherein the control member (11) is operably connected to the driver (1) and wherein the control member (11), the driver (1) and the driver shaft (9) are configured to rotate concentrically together. The control member may be any shape and sizes. It may be grip-able by an operator. Example control members may include without limitation a knob, a handle, a round structure, an oval structure, an oblong structure, or a polygon structure.

In another aspect, the disclosure provides double clutch assemblies. In one embodiment, the double clutch assembly includes a first clutch assembly and a second clutch assembly. The first clutch assembly includes a cylinder (21), a driver assembly and a follower (2). The driver assembly includes a control member (11), a driver (1), and a driver shaft (9). The control member (11), the driver (1), the driver shaft (9) and are configured to rotate concentrically together. The cylinder (21) is operably connected to the driver shaft (9) such that the rotation of the cylinder (21) is configured to move the driver shaft (9) linearly causing the driver shaft (9) to engage with or disengage from the follower (2). When the driver shaft (9) engages with the follower (2), the follower (2) is operably connected with the driver assembly and rotates concentrically together with the driver assembly. When the drive shaft (9) disengages with the follower (2), the follower (2) is operably disconnected with the driver assembly. The second clutch assembly includes an actuating assembly and a coupler (3). The coupler (3) is operably connected with and therefor is configured to rotate concentrically with the driver assembly. The actuating assembly is operably connected to the coupler (3) and is configured to move the coupler (3) causing the coupler (3) to disengage from or engage with the follower (2). When the coupler (3) engages with the follower (2), the follower (2) is operably connected with the driver assembly and rotates concentrically together with the driver assembly. When the coupler (3) disengages with the follower (2), the follower (2) is operably disconnected with the driver assembly.

In one embodiment, the coupler (3) includes a first coupling structure (12). The follower (2) includes a second coupling structure (15). The first coupling structure is configured to engage with the second coupling structure. The follower (2) is configured to operably connect with or disconnect from the coupler (3). When the first coupling structure is engaged with or disengaged from the second coupling structure, respectively.

In one embodiment, the actuating assembly may include a motor (8) having a rotation shaft (7) and an actuating arm (4) having a first end and the second end. The motor (8) is configured to rotate the rotation shaft (7). The first end is operably connected to the rotation shaft (7), and the second end is operably connected to the coupler (3). The motor (8) is configured to rotate the first end of the actuating arm (4) through the rotation shaft (7) producing a swing motion at the second end of the actuating arm (4). The swing motion at the second end of the actuating arm is configured to cause the coupler (3) to move back and forth along the central axis of the driver shaft (9) leading to the disengagement and engagement between the first and the second coupling structure.

In one embodiment, the first end of the actuating arm (4) includes a spring (6) and the first end is operably connected to the rotation shaft (7) by wounding the spring (6) onto to the rotation shaft (7). In one embodiment, the coupler (3) includes a groove (10). The second end of the actuating arm (4) includes a hook (5), and the hook (5) is placed into the groove (10).

In one embodiment, the driving shaft (9) has a polygon-shaped cross-section. The coupler (3) includes a polygon-shaped central bore (16). The coupler (3) is threaded onto the driving shaft (9) through the polygon-shaped central core (16) allowing the coupler to slide along the central axis of the driving shaft (9).

In one embodiment, the double clutch assembly further includes a latch or a deadbolt operably connected to the follower (2). When the coupler (3) is disengaged from the follower (2), the control member (11) is disconnected from the latch or the deadbolt. When the coupler (3) is engaged with the follower (2), rotating the control member (11) is configured to produce a linear motion on the latch or deadbolt.

In another aspect, the disclosure provides lock systems including the clutch assembly described thereof. In one embodiment, rotating the control member (11) is configured to retract and extend the latch or the deadbolt when the coupler (3) is engaged with the follower (2), and the control member (11) is disconnected from the latch or the deadbolt when the coupler (3) is disengaged from the follower (2).

In one embodiment, the lock system may further include an authenticating device. The authenticating device is configured to authenticate an operator and to control the engagement and disengagement between the coupler (3) and the follower (2) therefore connecting and disconnecting the control member (11) with the latch or deadbolt. When the authenticating device authenticates the operator, the coupler (3) engages with the follower (2) allowing the operator to extend and retract the latch or deadbolt by rotating the control member (11).

The authenticating device may include a key operated lock mechanism, a biometric authenticating mechanism, a passcode authenticating mechanism, or a wireless sensing device. In one embodiment, the lock system may include at least two or at least three of the authenticating devices.

The biometric authenticating mechanism is configured to authenticate a fingerprint, an iris pattern, a cardio-electromagnetic wave, a voice, a sound combination, a gesture, or a combination thereof. The wireless sensing device is configured to receive an authenticating signal from a mobile device. The authenticating signal from a mobile device comprises an authenticating signal derived from authenticating a fingerprint, an iris pattern, a cardio-electromagnetic wave, a voice, a sound, a gesture, or a combination thereof.

In further aspects, the disclosure provides lock system kits incorporating the disclosed clutch assemblies and doors equipped with the disclosed lock systems.

In yet another aspect, the disclosure provides methods for locking or unlocking a lock system by an operator. In one embodiment, the method includes the steps of operably connecting the control member (11) with the latch or deadbolt by activating at least one of the first or the second clutch assembly, and turning the control member (11) to extend or retract the latch or deadbolt and therefore lock or unlock the lock system. The first assembly system is activated by rotating the cylinder (21) using a key and engaging the driver shaft (9) with the follower (2). The second assembly system is activated by authenticating the operator using the authenticating device. If the operator is authenticated, the coupler (3) engages with the follower (2) connecting the control member (11) operably with the latch or deadbolt.

In one embodiment, authenticating the operator includes authenticating a biometric signal from the operator using the authenticating device. In one embodiment, the authenticating the operator includes authenticating a passcode input from the operator using the authenticating device.

In a further aspect, the disclosure provides methods for locking or unlocking a lock system by an operator incorporating the clutch assemblies described therein. In one embodiment, the method includes authenticating the operator using the authenticating device; if the operator is authenticated, engaging the coupler (3) with the follower (2) and therefore operably connecting the control member (11) with the latch or deadbolt; and turning the control member (11) to extend or retract the latch or deadbolt and therefore lock or unlock the lock system. In one embodiment, authenticating the operator includes authenticating a biometric signal from the operator using the authenticating device. In one embodiment, the authenticating the operator includes authenticating a passcode input from the operator.

In a further aspect, the disclosure provides doors, furniture, bikes, buildings, apparatus, devices, and systems having locks with the above described clutches and clutch assemblies.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedia components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components. In addition, the "operably coupled," "operably connected," "coupled," or "connected" may be either directly coupled or connected or indirectly coupled or connected.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by prior disclosure.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A clutch assembly for a lock system, comprising,
    a driver assembly, comprising a driver (1) and a driver shaft (9) as a single piece, wherein the driver (1) and the driver shaft (9) are configured to rotate concentrically together;
    a follower (2), wherein the driver shaft (9) does not extend through the follower (2); and
    a cylinder (21), wherein the cylinder (21) is operably connected to the driver shaft (9) such that the rotation of the cylinder (21) is configured to move the driver shaft (9) linearly causing the driver shaft (9) to engage with or disengage from the follower (2), wherein, when the driver shaft (9) engages with the follower (2), the follower (2) is operably connected with the driver assembly and rotates concentrically together with the driver assembly, and when the drive shaft (9) disengages with the follower (2), the follower (2) is operably disconnected with the driver assembly,
    wherein the driver shaft (9) has a first driver end (19) and a second driver end (25), wherein the driver shaft (9) is operably connected to the cylinder (21) at the first driver end (19) and is configured to engage with the follower (2) at the second driver end (25), and wherein the second driver end (25) does not extend through the follower 2, and
    wherein the first driver end (19) is operably connected to the cylinder (21) through a coil spring (18), and wherein the coil spring (18) and is configured to rotate with the cylinder (21).

2. The clutch assembly of claim 1, wherein the coil spring (18) is operably connected to the cylinder (21) at a first spring end and to the first driver end (19) at a second spring end.

3. The clutch assembly of claim 2, wherein the first driver end (19) comprises a protruding structure (20) protruding radially and extending in-between the threads of the coil spring (18), wherein the protruding structure (20) is configured to slide between the threads of the coil spring (18) such that rotation of the coil spring (18) causes the driver shaft (9) to move linearly along the central axis of the coil spring (18).

4. A clutch assembly for a lock system, comprising,
    a driver assembly, comprising a driver (1) and a driver shaft (9) as a single piece, wherein the driver (1) and the driver shaft (9) are configured to rotate concentrically together;
    a follower (2), wherein the driver shaft (9) does not extend through the follower (2);
    a cylinder (21), wherein the cylinder (21) is operably connected to the driver shaft (9) such that the rotation of the cylinder (21) is configured to move the driver shaft (9) linearly causing the driver shaft (9) to engage with or disengage from the follower (2), wherein, when the driver shaft (9) engages with the follower (2), the follower (2) is operably connected with the driver assembly and rotates concentrically together with the driver assembly, and when the drive shaft (9) disengages with the follower (2), the follower (2) is operably disconnected with the driver assembly;
    a coupler (3) having a groove (10), wherein the coupler (3) is configured to rotate concentrically together with the driver assembly, wherein the coupler (3) are configured to engage or disengage the follower (2), wherein the follower (2) is configured to rotate concentrically together with the driver assembly when engaged with the coupler (3), and wherein the follower (2) is disconnected from the driver assembly when disengaged from the coupler (3); and
    an actuating assembly, wherein the actuating assembly comprises
    a motor (8) having a rotation shaft (7), wherein the motor (8) is configured to rotate the rotation shaft (7); and
    an actuating arm (4) as a single piece comprising a first end having a spring (6) and the second end having hook (5), wherein the first end is operably connected to the rotation shaft (7) by wounding the spring (6) onto to the rotation shaft (7), wherein the second end is operably connected to the coupler (3) by placing the hook (5) into the groove (10), wherein the motor (8) is configured to rotate the first end of the actuating arm (4) through the rotation shaft (7) producing a swing motion at the second end of the actuating arm (4), wherein the swing motion at the second end of the actuating arm is configured to cause the coupler (3) to move back and forth along the central axis of the driver shaft (9) leading to the disengagement and engagement between the first and the second coupling structure.

5. A double clutch assembly for a lock system, comprising,
    a first clutch assembly, comprising,
    a cylinder (21),
    a driver assembly, comprising a control member (11), a driver (1), and a driver shaft (9) as a single piece, wherein the control member (11), the driver (1), and the driver shaft (9) are configured to rotate concentrically together; and
    a follower (2), wherein the driver shaft (9) does not extend through the follower (2),
    wherein the driver shaft (9) has a first driver end (19) and a second driver end (25), wherein the first driver end (19) is operably connected to the cylinder (21) through a coil spring (18), wherein the first driver end (19) comprises a protruding structure (20) protruding radially and extending in-between the threads of the coil spring (18), wherein the protruding structure (20) is configured to slide between the threads of the coil spring (18) such that rotation of the coil spring (18) causes the driver shaft (9) to move linearly along the central axis of the coil spring (18), and wherein the coil spring (18) and is configured to rotate with the cylinder (21), and wherein the cylinder (21) is operably connected to the driver shaft (9) such that the rotation of the cylinder (21) is configured to move the driver shaft (9) linearly causing the driver shaft (9) to engage with or disengage from the follower (2), wherein, when the driver shaft (9) engages with the follower (2), the follower (2) is operably connected with the driver assembly and rotates concentrically together with the driver assembly, and wherein, when the drive shaft (9) disengages with the follower (2), the follower (2) is operably disconnected with the driver assembly; and a second clutch assembly, comprising an actuating assembly, a coupler (3), wherein the coupler (3) is operably connected with and therefor is configured to rotate concentrically with the driver assembly, wherein the actuating assembly is operably connected to the coupler (3) and is configured to move the coupler (3) causing the coupler (3) to disengage from or engage with the follower (2), wherein, when the coupler (3) engages with the follower (2), the follower (2) is operably connected with the driver assembly and rotates concentrically together with the driver assembly, and wherein, when the coupler (3) disengages with the follower (2), the follower (2) is operably disconnected with the driver assembly.

6. The double clutch assembly of claim 5, wherein the coupler (3) comprises a first coupling structure (12), wherein the follower (2) comprises a second coupling structure (15), wherein the first coupling structure is configured to engage with the second coupling structure, and wherein the follower (2) is configured to be operably connected with or disconnected from the coupler (3), when the first coupling structure is engaged with or disengaged from the second coupling structure, respectively.

7. The double clutch assembly of claim 5, wherein the actuating assembly comprises a motor (8) having a rotation shaft (7), wherein the motor (8) is configured to rotate the rotation shaft (7); and an actuating arm (4) as a single piece comprising a first end having a spring (6) and the second end having a hook (5), wherein the first end is operably connected to the rotation shaft (7) by wounding the spring (6) onto to the rotation shaft (7), wherein the second end is operably connected to the coupler (3) by placing the hook (5) into the groove (10), wherein the motor (8) is configured to rotate the first end of the actuating arm (4) through the rotation shaft (7) producing a swing motion at the second end of the actuating arm (4), wherein the swing motion at the second end of the actuating arm is configured to cause the coupler (3) to move back and forth along the central axis of the driver shaft (9) leading to the disengagement and engagement between the first and the second coupling structure.

8. The double clutch assembly of claim 5, further comprising a latch or a deadbolt operably connected to the follower (2), wherein, when the coupler (3) is disengaged from the follower (2), the control member (11) is disconnected from the latch or the deadbolt, and wherein, when the coupler (3) is engaged with the follower (2), rotating the control member (11) is configured to produce a linear motion on the latch or deadbolt.

9. A lock system, comprising the double clutch assembly of claim 8, wherein, when the coupler (3) is engaged with the follower (2), rotating the control member (11) is configured to retract and extend the latch or the deadbolt, and wherein, when the coupler (3) is disengaged from the follower (2), the control member (11) is disconnected from the latch or the deadbolt.

10. The lock system of claim 9, further comprising an authenticating device, wherein the authenticating device is configured to authenticate an operator and to control the engagement and disengagement between the coupler (3) and the follower (2) therefore connecting and disconnecting the control member (11) with the latch or deadbolt.

* * * * *